Patented Nov. 12, 1940

2,221,404

UNITED STATES PATENT OFFICE 2,221,404

TREATMENT OF GLYCERIDE OILS

Sidney Musher, New York, N. Y., assignor to Musher Foundation Incorporated, New York, N. Y., a corporation of New York No Drawing. Application February 24, 1940, Serial No. 320,637

2 Claims. (Cl. 99—163)

This invention relates to the preservation of glyceride oils against the development of rancidity and to the development in those oils of novel desirable flavors and odors.

The large proportion of glyceride oils that are produced and are commercially available are substantially odorless and tasteless having been subjected to a series of refining treatments including causticizing, bleaching and high temperature deodorization so that at the conclusion of such refining treatments, they have no odor or taste characteristics to set apart one type of oil from another.

It was suggested in my prior Patent 2,069,265 to add certain low moisture containing and readily and easily ground products such as sesame seeds and peanuts to such glyceride oils in order to improve their keeping quality.

It, however, has not been found readily possible to treat such glyceride oils with olives and in order to obtain an effective infusion from olives, it has been found necessary to prepare the olive in a special manner so that it will become a better base for infusion purposes.

Moreover, it has been found possible to process the olive material in such a way that unusual odor and flavor characteristics may be transmitted into the glyceride oil by the infusion process which characteristics differ substantially from the flavor and odor of ordinary expressed olive oil and which flavor and odor of the infused oil are much more pleasing and desirable than the characteristic flavor and odor of ordinary olive oil as obtained by usual commercial procedure.

Preparation of the olives

In preparing the olives for infusion, the olives are picked desirably when they are fully ripe and before any fermentation has set in. The olives may be in their slightly pre-ripe condition, but this is generally considered undesirable and it is preferable for the olives to be substantially in ripe form.

Immediately after the olives have been picked, they should desirably be packed with from 15% to 100% and preferably about 50% of their total weight of common salt by alternating layers of salt and olives. At regular intervals ranging from one to three days, the brine produced is poured off and the salting allowed to continue until the total moisture content of the olives is 30% or less and preferably under 25%. This will require from about 15 to 35 days and the olives will contain from about 5% to 10% of salt.

This dehydration is highly desirable and the salting down treatment appears definitely to enhance the value of the olives for the subsequent infusion process.

The salted olives may be further dried from 30% moisture to under 20% moisture. For example, the salted olives may be placed in a revolving drum and dried preferably under reduced pressure. Where desired, the drying may take place at atmospheric pressure or the olives may be dried by allowing a stream of hot air to flow through them.

Where the olives are dried at atmospheric pressure, the olives are placed into a revolving drum containing paddles and, while the drum is revolving, a stream of heated air having a temperature of between 1000° F. and 1600° F. enters one end of the cylinder and passes out the other end of the cylinder at a temperature of about 230° F. to 275° F. When the olives have reached the desired point of dryness of under 20% moisture, they are removed from such chamber.

Another method that may be utilized for the drying of the olives is to expose them in open trays and in thin layers to the direct heat of the sun provided sufficient sunshine is available for the olives to be further dried.

It may in some cases be desirable to immerse the olives immediately after picking and before the brining or salting in 1% to 2% soda lye solution for from a few minutes to several hours and then to wash the olives in a water several times to remove the lye from them. As a result of the lye treatment, some of the bitter principles of the olive will also be removed.

The olives, if dried to a point too hard for macerating, may be immersed in a glyceride oil such as in refined corn oil or refined cottonseed oil in order to soften the tissues and fleshy portions of the olive. The immersion of the olives in the glyceride oil should take place after the olives have been salted and dehydrated and the olives may be allowed to remain soaking in the oil for a period of about fifteen minutes to forty-eight hours, and then removed from such oil bath.

Where desired, the olives when freshly picked or after salting, may be subjected to a pulping or pitting operation, whereby their pits are removed and only the flesh portions utilized.

The salted, dehydrated olive containing under 30% and desirably under 20% of total moisture is then macerated and ground to a fine paste. This is best accomplished by first adding the olive to a grinding machine which pulverizes the pits and also breaks into the fleshy portion. Where the pits are previously removed, the preliminary grinding is not required.

The olives are then subjected to a stone or iron rolling or colloid mill treatment. For example, they may be allowed to pass between stone rollers, the upper roll operating at a different speed from the lower roll in order to finely mill and divide the olive into a paste form. Desirably the olives are subjected to a colloid mill treatment whereby the fine paste is produced.

The paste should be so completely ground that when rubbed between the fingers, the individual particles of the olive can no longer be felt but will be perfectly smooth to the touch.

Where desired, there may be added to the olive before or during the final operation of producing the paste a small quantity, preferably less than 50% against the weight of the olive, of an added glyceride oil and preferably of the oil with which the olive paste is subsequently to be used. For example, if the olive paste is to be employed with refined deodorized corn oil, then the refined deodorized corn oil may be added to the colloid mill at the time the olive pieces are added, on the basis of using 50% of added corn oil against the total weight of the olives and the mixture then put through the colloid mill so that a thinner, more free flowing paste is obtained.

During the macerating or grinding process, the temperature should desirably not exceed 212° F. in order to avoid any burning or scorching of the olives. Where the olive paste is insufficiently dried, it may be further subjected to a drying operation by exposing to a draft of heated air while kept in agitation or by heating under reduced pressure. The olive paste is then ready for addition to and infusion in the glyceride oil.

*Treatment of glyceride oil with prepared olives*

Among the glyceride oils that may be employed for infusion with the olives thus prepared are included particularly any of the refined oils such as refined cottonseed, soya bean, olive and corn oils. By a refined oil is meant an oil which has been subjected to the usual refining processes that may include causticizing, bleaching, winterizing and high temperature deodorization, and such oil being substantially tasteless and odorless and in the normal condition in which it is commonly available on the market for general use.

Other glyceride oils that may similarly be treated are the fish and fish liver oils including cod liver and halibut liver oils.

In the treatment of these glyceride oils, the olive paste is added to and thoroughly dispersed in the glyceride oil in an amount of less than 25% and desirably in an amount of 10% or less. As little as 0.5% up to 5% will give highly desirable results.

The olive paste is mixed thoroughly throughout the body of the oil and preferably while the oil is at a slightly elevated temperature or such as at about 160° F. to 200° F. and desirably at about 175° F. The oil containing the olive paste is agitated for a short period of time ranging from one minute to several hours and it is then the undesired solids of the olive are removed by centrifuging, filtration or similar means.

It is particularly desirable where possible for the oil containing the olive paste thoroughly dispersed therein to be put through a colloid mill in order to completely contact the individual particles of the olive with the glyceride oil. In other words, the oil containing the olive paste is well agitated at the slightly elevated temperature and passed through the colloid mill. Under these conditions the oil does not subsequently require any further time period for the olive paste to remain in contact with that oil but the oil may then be subjected to immediate filtration, centrifuging or other treatment to remove the undesired solids.

When, for example, a refined deodorized cottonseed oil or corn oil is treated in accordance with this invention with say 10% of an olive paste prepared in the manner indicated above, the mixture of the olive paste and the oil having been carried out at about 175° F. for 15 minutes and then with the undesired solids removed by filtration, the resultant oil has entirely new characteristics from a standpoint of odor and taste and is even superior to a fine, natural olive oil. In addition, the refined deodorized cottonseed or corn oil is materially improved in keeping quality and it is frequently possible to extend the life of a glyceride oil by three or four times when utilizing this process.

Where the dried salted olive is added to the glyceride oil and the entire composition put through a colloid mill or similarly dispersed, it is unnecessary to apply heat during the infusion procedure.

The high moisture containing olive in its original and natural condition is not capable of treatment in accordance with this invention. Where the original undried olive is ground to a paste and where that paste is then added to and mixed in the glyceride oil, said glyceride oil does not take on the desirable flavor and aromatic and other characteristics which are obtained when the olive is first processed in the manner indicated above and then ground in the glyceride oil.

Where the whole olive is salted or brined, the salt appears to enhance the desirable flavor and odor characteristics of the glyceride oil with which the salted, dehydrated olive is ground, although it is normally to be expected that the salt as an oil insoluble material would have no effect.

As a much less preferable alternative, instead of the heavy salting, there may be applied a thin surface coating of no more than about 1% to 2% of salt to the olive when freshly picked or the salting may be omitted. This less preferable procedure may be followed only when the olives are immediately thereafter and within less than 24 hours from the time of picking subjected to a quick drying as when exposed to direct sunshine in open trays or when machine dried at an elevated temperature in the aforesaid manner.

The olives thus obtained are much more difficult to grind and to reduce to a paste form for infusion purposes and more and longer grinding must be resorted to.

When such olive paste is infused in a glyceride oil, however, the characteristics imparted to the oil are very much less desirable than where the salted, dehydrated olive paste is employed.

This application is a continuation of application Serial No. 282,079, filed June 30, 1939, now Patent No. 2,199,364.

Having described my invention, what I claim is:

1. The method of treating a glyceride oil to give it novel flavor and odor characteristics which comprises infusing said oil at a slightly elevated temperature with a small amount of a low moisture containing, dehydrated, macerated olive paste for a short period and then removing the olive paste solids therefrom.

2. A substantially stabilized glyceride oil having novel flavor and odor characteristics containing a small amount of the glyceride oil soluble constituents derived from a dehydrated, low moisture containing, macerated olive paste, the oil being substantially free of the fibers of said olive paste.

SIDNEY MUSHER.